United States Patent [19]

Wade

[11] 4,181,572

[45] Jan. 1, 1980

[54] CLOSURE HEAD FOR A NUCLEAR REACTOR

[75] Inventor: Elman E. Wade, South Huntingdon, Pa.

[73] Assignee: The United States of America as represented by the United States Department of Energy, Washington, D.C.

[21] Appl. No.: 806,972

[22] Filed: Jun. 16, 1977

[51] Int. Cl.² ............... G21C 13/06; E06B 7/16; B65D 53/00

[52] U.S. Cl. .................................. 176/87; 49/480; 220/224

[58] Field of Search ............... 176/30, 31, 32, 40, 176/65, 87, DIG. 2, 37, 38; 277/115; 49/480, 498; 220/217, 221, 224, 225, 228

[56] References Cited

U.S. PATENT DOCUMENTS

| | | | |
|---|---|---|---|
| 2,288,263 | 6/1942 | Bostwick | 277/115 |
| 2,993,713 | 7/1961 | Krueger | 277/115 |
| 3,698,724 | 10/1972 | Blachere | 176/87 |
| 3,819,478 | 6/1974 | Thorel | 176/87 |
| 3,867,254 | 2/1975 | Brandstetter | 176/87 |
| 4,050,988 | 9/1977 | Lemercier | 176/87 |
| 4,078,969 | 3/1978 | Garin | 176/87 |
| 4,080,254 | 3/1978 | Poindexter | 176/87 |

OTHER PUBLICATIONS

Krueger, Rudolph E. & Co., "A Dynamic Seal for Use in Extreme Temperature Service", Publication by Rudolph E. Krueger Co.

Primary Examiner—Samuel W. Engle
Assistant Examiner—Donald P. Walsh
Attorney, Agent, or Firm—L. A. DePaul; Z. L. Dermer

[57] ABSTRACT

A closure head for a nuclear reactor includes a stationary outer ring integral with the reactor vessel with a first rotatable plug disposed within the stationary outer ring and supported from the stationary outer ring by a bearing assembly. A sealing system is associated with the bearing assembly to seal the annulus defined between the first rotatable plug and the stationary outer ring. The sealing system comprises tubular seal elements disposed in the annulus with load springs contacting the tubular seal elements so as to force the tubular seal elements against the annulus in a manner to seal the annulus. The sealing system also comprises a sealing fluid which is pumped through the annulus and over the tubular seal elements causing the load springs to compress thereby reducing the friction between the tubular seal elements and the rotatable components while maintaining a gas-tight seal therebetween.

14 Claims, 5 Drawing Figures

CLOSURE HEAD FOR A NUCLEAR REACTOR

GOVERNMENT CONTRACT

The invention described herein was made in the course of, or under, a contract with the United States Energy Research and Development Administration.

BACKGROUND OF THE INVENTION

This invention relates to closure heads for nuclear reactors and more particularly to closure heads for nuclear reactors having a sealing and lubricating system.

In nuclear reactor designs well known in the art, a reactor vessel with fuel assemblies disposed therein and having an inlet and an outlet for circulation of a coolant in heat transfer relationship with the fuel assemblies, is sealed by a closure head located on top of the reactor vessel. In certain designs, the closure head comprises one or more rotatable plugs. These rotatable plugs which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. The annulus, while allowing the rotation of the plugs, also establishes a path for the release of radioactive particles located in the reactor vessel. Accordingly, seals are provided at various locations across the annulus to prevent this release of radioactive particles. The seals also function to prevent oxygen in the atmosphere outside the reactor vessel from passing through the annulus to the reactor coolant, which in a liquid metal fast breeder reactor may be liquid sodium, because contact of liquid sodium with oxygen may result in the formation of impurities in the liquid sodium. To further prevent oxygen leakage into the reactor vessel, a cover gas is provided that fills the space from the top of the reactor coolant pool to the bottom of the closure head and up the annulus to the seals across the annulus.

One type of closure head seal well known to those skilled in the art is a liquid dip seal. In a liquid dip seal, the annulus between the closure head plugs is contoured so that a trough is formed by the annulus itself. A liquid such as liquid sodium is placed in the trough thereby dividing the annulus into two sections, one above the liquid and one below thereby forming a dip seal. The cover gas, inside the reactor, containing radioactive particles, then extends from the top of the reactor coolant pool up through the annulus to the liquid sodium in the dip seal. The liquid dip seal under normal conditions provides an effective seal against cover gas migration out of the annulus and against oxygen migration into the reactor vessel while allowing the rotatable closure head plugs to rotate relative to each other. However, it is generally considered advisable to utilize another type of seal in conjunction with the dip seal in order to prevent contact between the liquid metal and air.

Another type of closure head seal well known in the art is the inflatable seal wherein single or multiple inflatable seals in series are placed across the annulus. During reactor refueling, the inflatable seals are slightly deflated to allow better rotation on the rotatable closure head plugs while during reactor operation the seals are inflated to increase their sealing capability. Examples of these types of seals may be found in U.S. Pat. No. 3,514,115 to S. Gallo, issued May 26, 1970 and in U.S. Pat. No. 3,819,479 to R. Jacquelin, issued June 25, 1974.

Still another seal well known in the art is a type of labyrinth seal in which a piece of metal is bolted to one of the closure head plugs so as to extend across the annulus between the plugs to within close proximity to the other plugs. The purpose of this seal is to effectively lower the leak path area to thus limit leakage. Of course, since the piece of metal does not contact both rotatable components it does not provide an effective seal.

In addition, the other commonly known types of seals such as O-rings, bellows, etc., while possibly being effective under certain conditions, do not allow for effective rotation of the closure head plugs.

SUMMARY OF THE INVENTION

A closure head for a nuclear reactor comprising a stationary outer ring integral with the reactor vessel with a first rotatable plug disposed within the stationary outer ring and defining an annulus therebetween. A bearing is disposed in the annulus and attached to the stationary outer ring and the first rotatable plug for rotatably supporting the first rotatable plug from the stationary outer ring. A sealing system is disposed in the annulus and around the bearing for sealing the annulus against in leakage of oxygen and out-leakage of radioactive contaminants from within the reactor vessel. The sealing system comprises a tubular seal element disposed in the annulus and capable of contacting both the stationary outer ring and the first rotatable component under the actuation of load springs. In addition, the sealing system comprises a mechanism for pumping a lubricating fluid around the bearing, through the annulus, and around the tubular seal element thereby compressing the load springs and allowing the passage through the annulus of the lubricating fluid. The lubricating fluid in conjunction with the tubular seal element provides a seal across the annulus.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In designs of nuclear reactors that utilize rotatable plugs in the closure head of a reactor vessel, there exist annular passageways defined between the rotatable plugs and associated apparatus which allow the rotation of the plugs. In order to meet design requirements, seals must be provided that are capable of sealing these passageways under a variety of reactor conditions. The invention described herein serves to seal those kinds of passageways.

Figure 1:
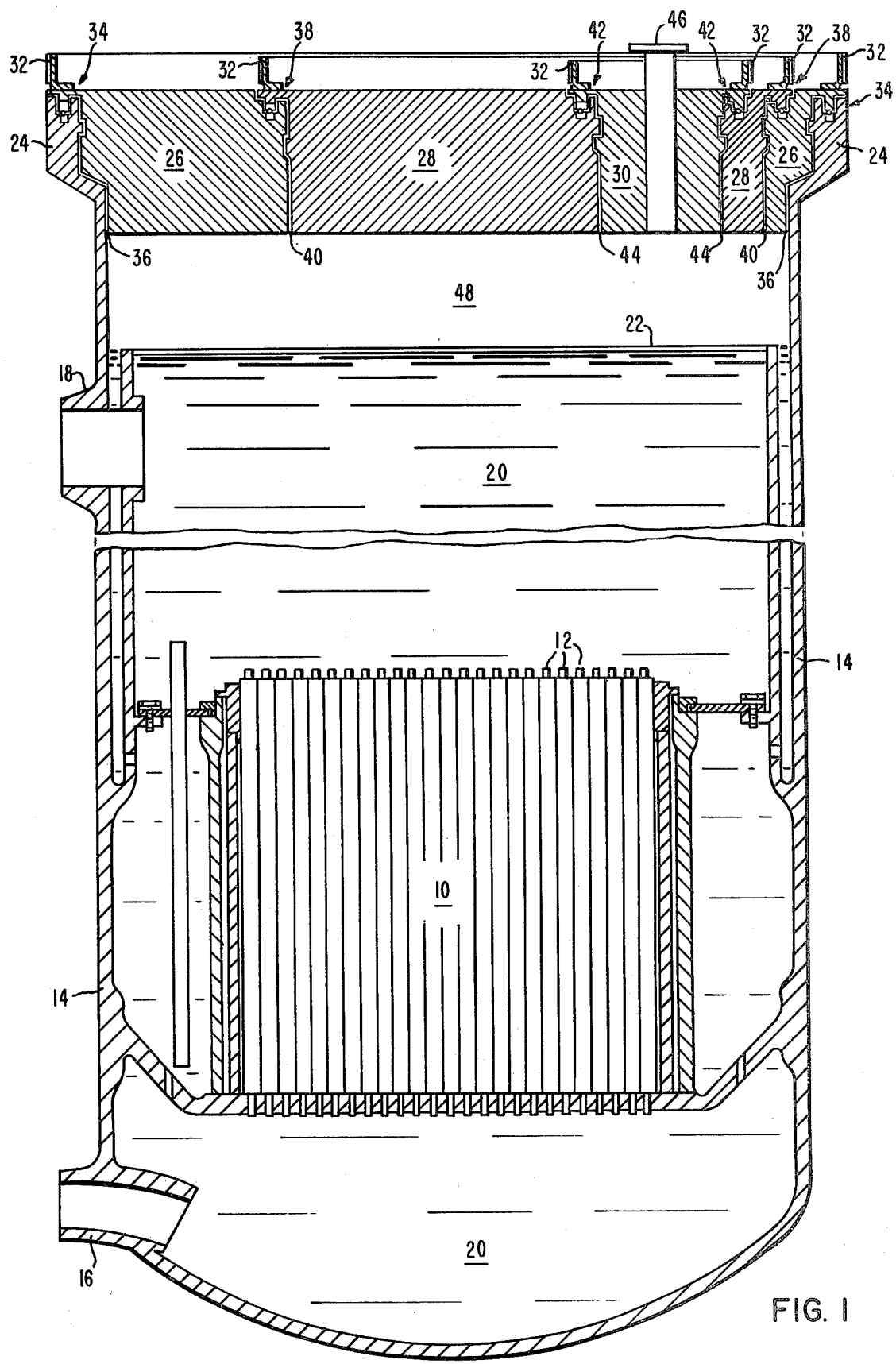
FIG. 1 is a cross-sectional view in elevation of a nuclear reactor.

Referring to FIG. 1, a core 10 comprising fuel assemblies 12 that produce heat is contained within a reactor vessel 14. The reactor vessel 14 has an inlet 16 and an outlet 18 that permit a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a first rotatable plug 26, a second rotatable plug 28, and a third rotatable plug 30. The stationary outer ring 24 may be integral with reactor vessel 14 or it may be attached to reactor vessel 14 by suitable means known in the art. In addition, a gear mechanism 32 may be mounted on each rotatable plug such that gear mechanism 32 may be driven by a drive mechanism (not shown) which in turn will rotate the particular rotatable plug. The first rotatable plug 26 is supported from stationary outer ring 24 by a first bearing assembly 34. The outer peripheral surface of the first rotatable plug 26 together with the inner peripheral surface of stationary outer ring 24 define a first annulus 36 therebetween. The first bearing assembly 34 enables the first rotatable plug 26 to move relative to stationary outer ring 24 while maintaining a fluid-tight boundary between the outside and the inside of reactor vessel 14.

Again referring to FIG. 1, second rotatable plug 28 is dispsosed eccentrically within first rotatable plug 26 and supported by second bearing assembly 38 defining a second annulus 40 therebetween in a manner similar to that of first bearing assembly 34. Likewise, third rotatable plug 30 is similarly eccentrically disposed within second rotatable plug 28 and supported by a third bearing assembly 42 defining a third annulus 44 therebetween. In addition, third rotatable plug 30 has disposed therein an in-vessel transfer collar 46 which provides access for an in-vessel transfer machine (not shown). During refueling, an in-vessel transfer machine which may be chosen from those wellknown in the art, is placed in the bore of the in-vessel transfer collar 46. When the in-vessel transfer machine is in place in the in-vessel transfer collar 46, a selected combination of rotations of the three rotatable plugs 26, 28, and 30 will align the in-vessel transfer machine in appropriate relationship with a chosen fuel assembly 12 of the core 10. As is well known in the art, the in-vessel transfer machine may then remove the chosen fuel assembly from the core and replace it with a fresh fuel assembly.

When the reactor coolant 20 is liquid sodium, as in the case of liquid metal fast breeder reactors, it is necessary to avoid contact of the liquid sodium with oxygen because this interaction will result in the formation of impurities in the liquid sodium. To thus avoid this interaction, the space between the bottom of the closure head and the coolant level 22 is filled with a cover gas 48 such as argon. The cover gas 48 not only fills the cover gas space between the bottom of the closure head and the top of the coolant level 22, but it also fills the annuli 35, 40, and 44. While the cover gas 48 prevents oxygen from contacting the coolant 20, the cover gas 48 itself is subjected to radiation exposure from the core and thus becomes contaminated with radioactive particles. It is, therefore, necessary to have the cover gas 48 circulated between the reactor vessel and the cleaning process to remove most of the radioactive particles in a manner well known in the art. As previously indicated, it is, nevertheless, necessary to prevent this cover gas 48 from escaping up the annuli 36, 40, and 44 through the seals in the closure head, and out of the reactor vessel.

Figure 2:
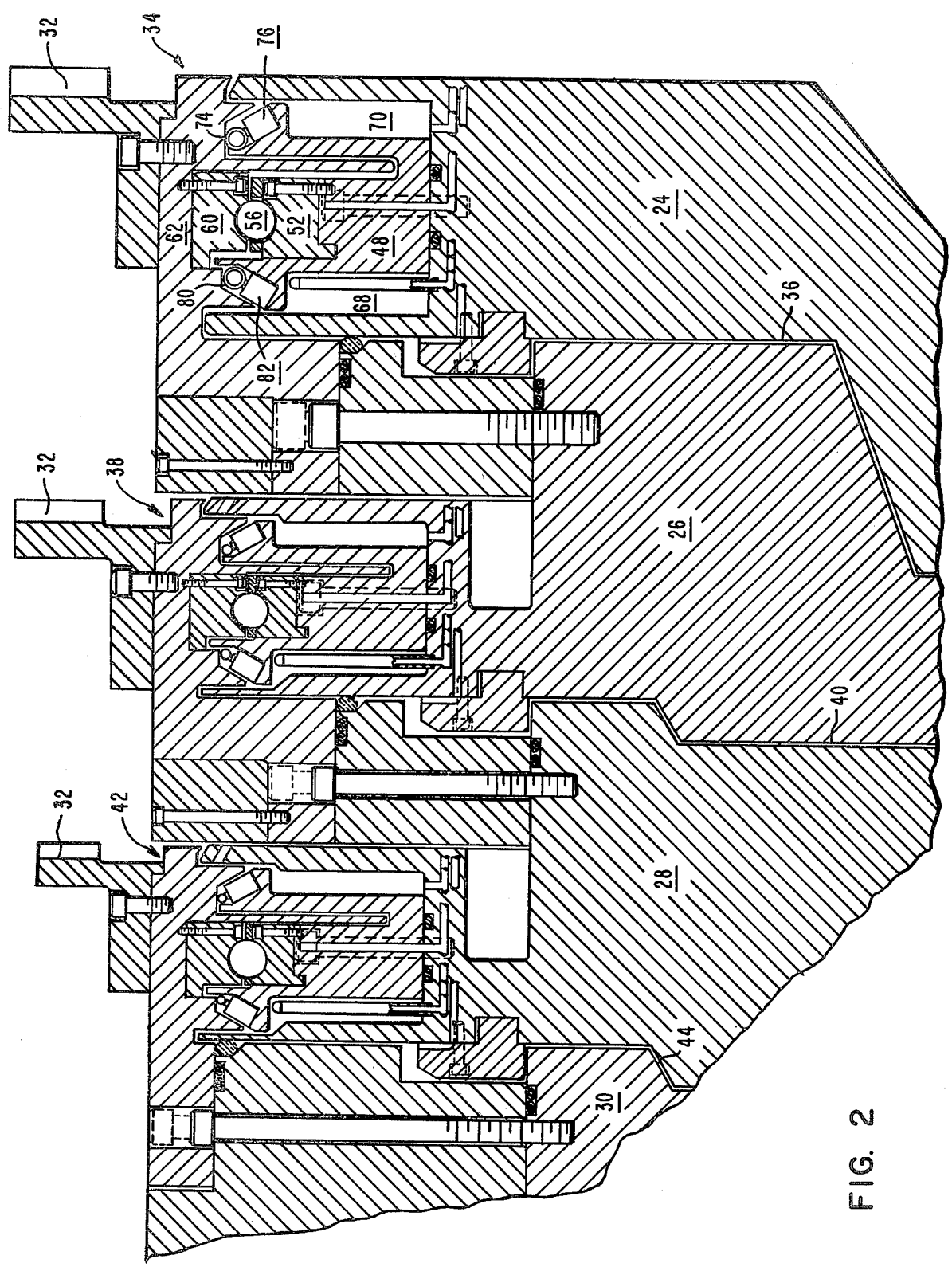
FIG. 2 is a cross-sectional view in elevation of a closure head for a nuclear reactor.
Figure 3:
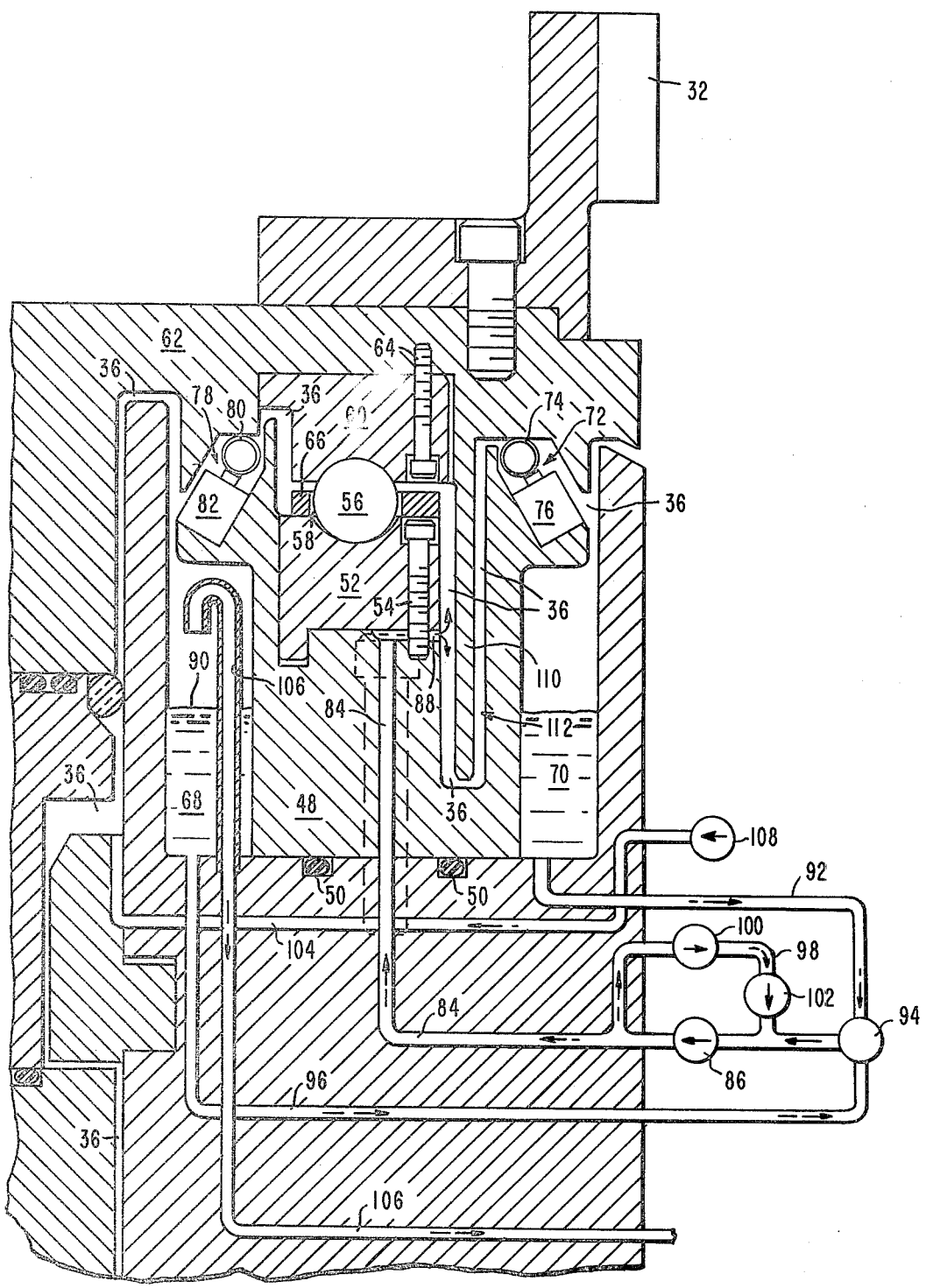
FIG. 3 is a cross-sectional view in elevation of the bearing and sealing system assembly.
Figure 5:
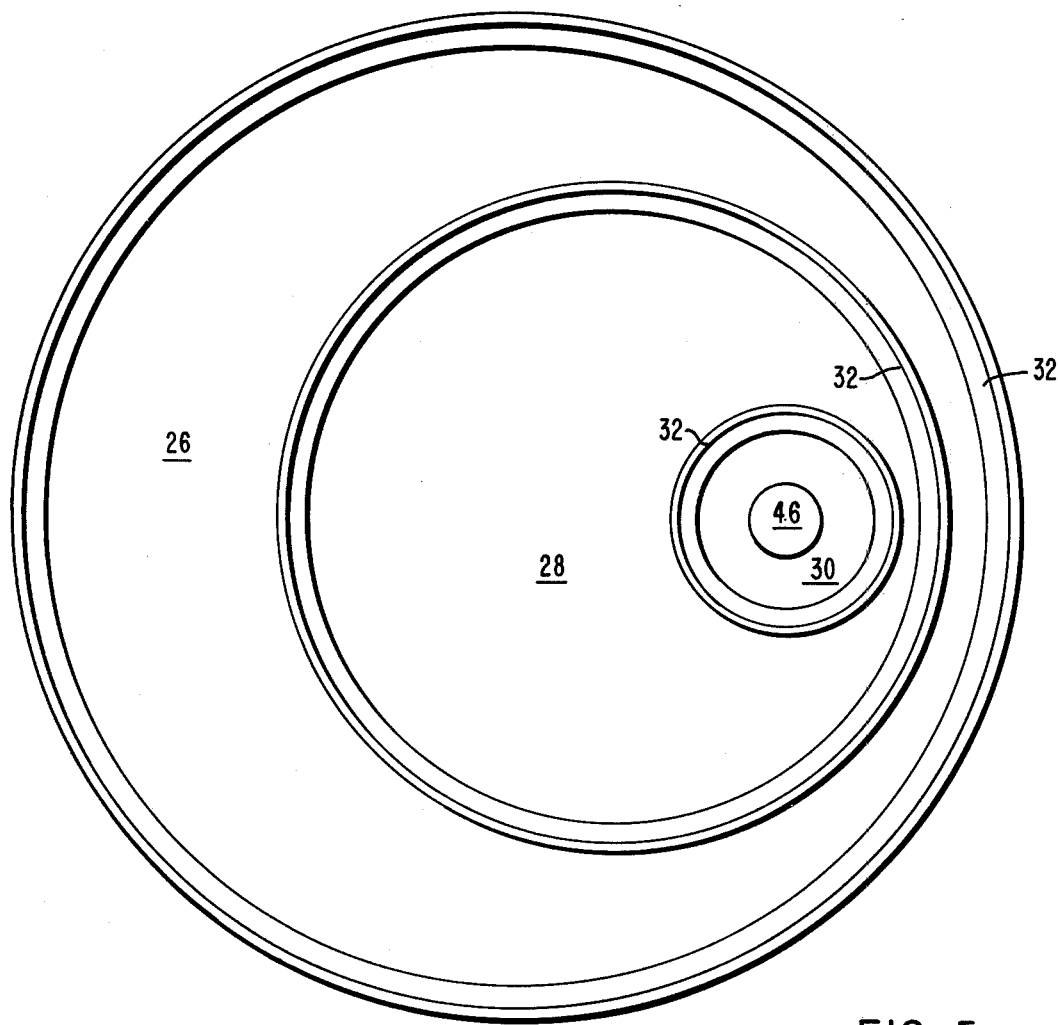
FIG. 5 is a plan view of a nuclear reactor shown in FIG. 1.

Referring now to FIGS. 2 and 3, while FIG. 2 is a partial view of the closure head of FIG. 1 illustrating the three bearing assemblies 34, 38, and 42, FIG. 3 is an enlargement of the first bearing assembly 34 which shows the elements of a typical bearing assembly. The bearing assembly comprises a bearing support 48 which rests upon and is sealed to the stationary outer ring 24 by two O-rings 50 which may be chosen from those well known in the art. The bearing inner race 52 is supported by the bearing support 48 and is bolted thereto by bolt 54. Bearing ball 56 is disposed in inner race 52 in a manner such that an additional clearance 58 is provided on the inner diameter of the inner race 52. Clearance 58 is provided to accommodate differential thermal expansion among the components of the closure head which allows the closure head to be manufactured of materials having various coefficients of thermal expansion. An outer race 60 rests on the bearing ball 56 and is bolted to the first rotatable plug flange 62 by bolt 64. Flange 62 may be attached to the first rotatable plug 26 by common means such as bolts or flange 62 may be an integral part of first rotatable plug 26. The arrangement of the first bearing assembly 34 and flange 62 of first rotatable plug 26 is such that the weight of first rotatable plug 26 is transmitted through the flange 62 and through bearing assembly 34 to the stationary outer ring 24 thereby providing a mechanism for allowing rotation of the first rotatable plug 26 with respect to the stationary outer ring 24 along annulus 36. A spacer 66 attached to inner race 52 is provided to maintain proper alignment of bearing ball 56.

The configuration of bearing support 48 in conjunction with the configuration of stationary outer ring 24 define two reservoirs between them; a first reservoir 68 and a second reservoir 70. In addition, the configuration of the components of bearing assembly 34 further define first annulus 36.

Still referring to FIG. 3, an outer seal 72 is disposed on the bearing support 48 so as to seal the annulus between flange 62 and bearing support 48. Outer seal 72 comprises a tubular seal element 74 which may be a stainless steel hollow O-ring disposed in annulus 36 that extends the circumference of the stationary outer ring 24 and load spring assembly 76 attached to the bearing support 48 so as to force the tubular seal element 74 against flange 62 thereby sealing the annulus. Outer seal 72 may be disposed on the bearing support 48 in various configurations; however, the preferred angle is approximately 30 degrees from the vertical. Likewise, an inner seal 78 is similarly disposed on the bearing support 48. Inner seal 78 also comprises a second tubular seal element 80 which may also be a stainless steel O-ring and a second load spring assembly 82 attached to the bearing support 48 so as to compress the second tubular seal element 80 against flange 62. A lubricant inlet 84 which may be a conduit chosen from those well known in the art is disposed in stationary outer ring 24 and bearing support 48 such that the outlet of lubricant inlet 84 is disposed on the underside of inner race 52. Lubricant inlet 84 is connected on its outer end to a lubricant pump 86 which may be a constant volume pump which is capable of pumping a lubricant such as silicone through the lubricant inlet 84, through a channel 88 where the lubricant flow divides into two flow paths, one flowing through first annulus 36 toward outer seal 72 and the other flowing through first annulus 36 toward bearing ball 56. The lubricating fluid flowing through the second path under pressure is forced around bearing ball 56 and over tubular seal element 80 thereby compressing load springs 82 and allowing the lubricant to pass between the tubular seal element 80, and flange 62. From inner seal 78, the lubricant flows into first reservoir 68 where it fills first reservoir 68 to a level 90. At the same time, the lubricating fluid flows through the first path over outer tubular seal element 74 and into second reservoir 70. As the lubricant passes over the tubular seal elements 74 and 80 a film of lubricant is established between the tubular seal element and flange 62 such that no gases may pass therebetween. In addition, the force of the lubricant on flange 62 can reduce the bearing load by as much as 10 to 20%. A typical silicone lubricant may be Dow Corning No. 710 cracked at 482° F. to remove low volatility fractions. The cracking avoids most of the off gassing at 450° F., the seal operating temperature.

Still referring to FIG. 3, a return conduit 92 is connected between second reservoir 70 and a first valve 94 which may be a three-way valve chosen from those well known in the art while another return conduit 96 is provided between first reservoir 68 and first valve 94. The return conduits 92 and 96 serve to direct the lubricating fluid to first valve 94 where the lubricating fluid is recirculated to lubricant pump 86. Furthermore, a recirculating conduit 98 is connected to lubricant inlet 84 and around lubricant pump 86 with a gate valve 100 and a pressure relief valve 102 disposed therein to enable lubricant pump 86 to maintain a constant volume flow even under varying operating conditions. However, during reactor refueling gate valve 100 is closed which prevents flow in recirculating conduit 98 and results in increased pressure on flange 62 which reduces the load on the bearing at a time when it is necessary to rotate the plugs. In addition, a gas inlet line 104 is connected to first annulus 36 while a gas outlet line 106 is disposed in first reservoir 68 with an opening above lubricant level 90 so that a gas such as argon may be pumped through first annulus 36 to thereby entrain contaminants in the gas flow thus purging the annulus. Also a check valve 108 may be disposed in gas inlet line 104 to prevent reverse flow in that line.

Still referring to FIG. 3, it should be noted that a circumferential extension 110 of flange 62 extends into bearing support 48 thereby defining a liquid dip seal 112 in first annulus 36. While the lubricating fluid is being pumped through first annulus 36 the lubricating fluid fills liquid dip seal 112 creating a fluid seal against gas leakage through first annulus 36. Moreover, should lubricant pump 86 not be operating, the lubricating fluid will, nevertheless, remain in liquid dip seal 112 thus sealing the annulus even when the lubricating fluid is not flowing.

Figure 4:
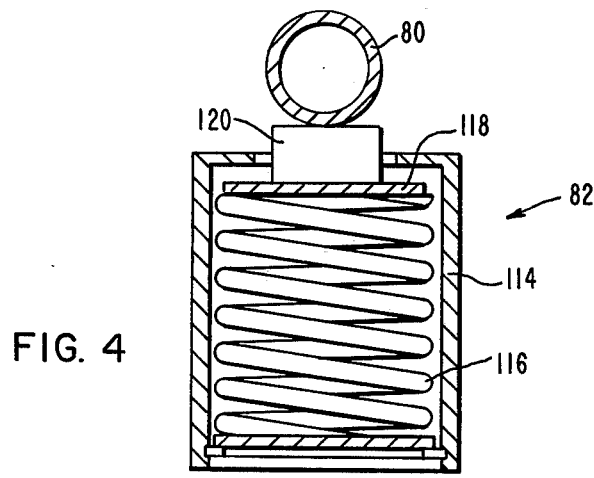
FIG. 4 is a cross-sectional view of the load spring assembly.

Referring now to FIG. 4, a typical load spring assembly such as load spring assembly 82 comprises a housing 114, a biasing mechanism such as a coil spring 116 mounted in housing 114, a platform 118 mounted in housing 114 on an end of coil spring 116, and a contact surface 120 attached to platform 118 for contacting tubular seal element 80. Coil spring 116 serves to force the tubular seal element against a surface such as flange 62 to seal the annulus 36. Of course, under pressure from the lubricating fluid coil spring 116 may be compressed thereby relieving pressure on the tubular seal element. Therefore, the invention provides a closure head for a nuclear reactor having a sealing and lubricating system for allowing rotation of rotatable closure head plus while sealing the annuli defined by the rotatable plugs.

I claim as my invention:

1. A closure head for a nuclear reactor comprising:
   a stationery outer ring disposed on a reactor vessel;
   a first rotatable plug disposed within said stationery outer ring defining a first annulus therebetween for enclosing internals of said reactor vessel and for positioning refueling equipment;
   a first bearing assembly mounted in said stationery outer ring and in contact with said first rotatable plug for supporting said first rotatable plug from said stationary outer ring;
   first seal means disposed in said first annulus for preventing passage of gases through said first annulus;
   first biasing means mounted on said stationery outer ring and near said first seal means for selectively contacting said first seal means and urging said first seal means into contact with said first rotatable plug thereby sealing said first annulus; and
   first fluid means connected to said first annulus near said first bearing assembly for introducing a fluid into said first annulus and into contact with said first seal means causing said first seal means to compress said first biasing means and allowing said fluid to pass over said first seal means while forming a fluid layer between said first seal means and said first rotatable plug thereby sealing said first annulus.

2. The closure head according to claim 1 wherein said closure head further comprises:
   second seal means disposed in said first annulus such that said first bearing assembly is disposed between said first seal means and said second seal means for preventing passage of gases through said first annulus; and
   second biasing means mounted on said stationery outer ring and near said second seal means for selectively contacting said second seal means and urging said second seal means into contact with said first rotatable plug thereby sealing said first annulus, said first fluid means also causing said fluid to contact said second seal means and causing said second seal means to compress said second biasing means and allowing said fluid to pass over said second seal means while forming a fluid layer between said second seal means and said first rotatable plug thereby sealing said first annulus.

3. The closure head according to claim 2 wherein said first annulus has a portion formed into a dip seal between said first seal means and said second seal means for further preventing passage of said gases therethrough.

4. The closure head according to claim 3 wherein said first seal means comprises a first tubular seal member disposed in said first annulus and extending around the circumference of said first rotatable plug.

5. The closure head according to claim 4 wherein said second seal means comprises a second tubular seal member disposed in said first annulus and extending around the circumference of said first rotatable plug.

6. The closure head according to claim 5 wherein said first biasing means comprises:
   a first housing mounted on said stationery outer ring;

a first spring mounted in said first housing and extending toward said first tubular seal member; and a first contact member mounted on said first spring near said first tubular seal member, said first spring causing said first contact member to contact said first tubular member thus forcing said first tubular member against said first rotatable plug.

7. The closure head according to claim 6 wherein said second biasing means comprises:
a second housing mounted on said stationery outer ring;
a second spring mounted in said second housing and extending toward said first tubular seal member; and
a second contact member mounted on said second spring near said second tubular seal member, said second spring causing said second contact member to contact said second tubular member thus forcing said second tubular member against said first rotatable plug.

8. The closure head according to claim 7 wherein said first fluid means comprises:
a fluid source;
an inlet conduit connected between said first annulus near said first bearing assembly and said fluid source for conducting said fluid from said fluid source to said first annulus;
a first return conduit connected at one end to said first annulus so that said first seal means is between said first bearing assembly and said first return conduit for conducting said fluid to said fluid source; and
a second return conduit connected at one end to said first annulus so that said second seal means is between said first bearing assembly and said second return conduit for conducting said fluid to said fluid source.

9. The closure head according to claim 8 wherein said fluid source comprises:
a pump connected in said inlet conduit for forcing said fluid through said inlet conduit; and
a recirculating system connected around said pump for maintaining a constant volume flow through said pump.

10. The closure head according to claim 9 wherein said fluid is a lubricating liquid for lubricating said first bearing assembly while sealing said first annulus.

11. The closure head according to claim 10 wherein said lubricating liquid is silicone.

12. The closure head according to claim 11 wherein said first bearing assembly comprises:
an outer race mounted in said first rotatable plug;
a bearing ball disposed in said outer race;
an inner race mounted in said stationery outer ring for supporting said bearing ball, said inner race having a clearance on its inner diameter between said inner race and said bearing ball for accommodating differential thermal expansion of the components of said closure head.

13. The closure head according to claim 12 wherein said closure head further comprises:
a gas inlet line connected to said first annulus for conducting a purge gas to said first annulus; and
a gas outlet line connected to said first annulus for conducting said purge gas from said first annulus thus purging said first annulus and removing contaminants therefrom.

14. The closure head according to claim 1 wherein said closure head further comprises:
a second rotatable plug disposed within said first rotatable plug defining a second annulus therebetween for enclosing said internals of said reactor vessel and for positioning said refueling equipment;
a second bearing assembly mounted in said first rotatable plug and in contact with said second rotatable plug for supporting said second rotatable plug from said first rotatable plug;
third seal means disposed in said second annulus for preventing passage of gases through said second annulus;
third biasing means mounted in said first rotatable plug and near said third seal means for selectively contacting said third seal means and urging said third seal means into contact with said second rotatable plug thereby sealing said second annulus; and
third fluid means connected to said second annulus near said second bearing assembly for introducing a second fluid into said second annulus and into contact with said third seal means causing said third seal means to compress said third biasing means and allowing said second fluid to pass over said third seal means while forming a fluid layer between said third seal means and said second rotatable plug thereby sealing said second annulus.

* * * * *